United States Patent [19]
Robin et al.

[11] 3,728,391
[45] Apr. 17, 1973

[54] 2,6-BIS-[(2-HYDROXY-ALKYL-PHENYL) METHYL]-4-AMINO-PHENOLS

[75] Inventors: Michael Robin, Colonia, N.J.; Sheldon R. Schulte, Columbus, Ohio

[73] Assignee: Ashland Oil, Inc., Houston, Tex.

[22] Filed: Mar. 20, 1970

[21] Appl. No.: 21,523

[52] U.S. Cl........260/570 R, 260/45.9 R, 260/243 R, 260/247, 260/247.5 R, 260/247.7 A, 260/294.7, 260/326.5 R, 260/326.5 L, 260/398.5, 260/814

[51] Int. Cl..............................................C07c 87/28

[58] Field of Search....................................260/570 R

[56] References Cited

UNITED STATES PATENTS

| | | | |
|---|---|---|---|
| 2,455,932 | 12/1948 | Hughes | 260/577 |
| 2,548,982 | 4/1951 | Kemp | 260/668 |
| 3,200,152 | 8/1965 | Ruppert et al | 260/570 |
| 3,267,145 | 8/1966 | Lund et al. | 260/570 |

Primary Examiner—Robert V. Hines
Attorney—Walter H. Schneider

[57] ABSTRACT

Novel UV stabilizers of the following formula:

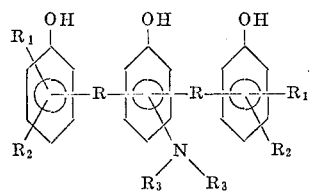

wherein each R individually is a saturated aliphatic hydrocarbon group or linkage of one to eight carbon atoms, each $R_1$ and $R_2$ individually is a bulky hydrocarbon group having from 1 to 22 carbon atoms or is an amino substituted alkyl of from one to 22 carbon atoms or is $-NR_3R_3$ or is hydrogen and each $R_3$ individually is either hydrogen or a lower alkyl of 1 to 8 carbon atoms, or both $R_3$'s are linked together so that $-NR_3R_3$ forms a heterocyclic ring, and at least one $R_1$ and/or $R_2$ on each phenolic nucleus being other than hydrogen, and provided along with the method of preparation.

13 Claims, No Drawings

2,6-BIS-[(2-HYDROXY-ALKYL-PHENYL) METHYL]-4-AMINO-PHENOLS

BACKGROUND OF THE INVENTION

This invention is directed to novel trinuclear phenols, and in particular to novel amine substituted trinuclear phenols, and to their process of preparation.

Synthetic polymers such as polyethylene, rubber (natural and synthetic), waxes, oils, fats and numerous other compounds are attacked by ultraviolet light and eventually may become useless for their intended purpose. The ultraviolet light induces free radical formation and thereby causes degradation of the material. In order to prevent such degradation induced by ultraviolet light, various ultraviolet light (UV) stabilizers have been added to various materials to absorb the ultraviolet light, to prevent it from causing the degradation of the material.

The prior art UV stabilizers have the disadvantage of losing effectiveness when exposed to ultraviolet light over comparatively long periods of time, even when used in synergistic combinations. Continuing work is therefore being done to obtain compounds with improved UV stabilizing characteristics. We have found that the novel compounds of our invention surprisingly and unexpectedly exhibit increased UV stabilizing properties; and thereby the quantity necessary to achieve the desired degree of stabilization is reduced.

BRIEF DESCRIPTION OF INVENTION

The produce aspect of this invention are novel compounds having the following formula:

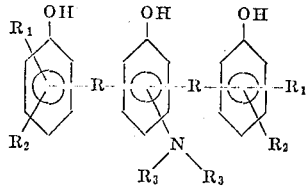

wherein each R individually is a saturated aliphatic hydrocarbon group or linkage of one to eight carbon atoms, each $R_1$ and $R_2$ individually is either hydrogen or a bulky hydrocarbon group having from one to 22 carbon atoms, or is an amino substituted alkyl of 1 to 22 carbon atoms or is $-NR_3R_3$, provided that at least one $R_1$ or $R_2$ on each phenolic ring is either a bulky hydrocarbon group having from one to 22 carbon atoms, or is an amino substituted alkyl of one to 22 carbon atoms, or is $-NR_3R_3$; and each $R_3$ individually is either hydrogen or a lower alkyl of from one to eight carbon atoms, or both $R_3$'s are linked together so — $NR_3R_3$ forms a heterocyclic ring.

The process aspect of this invention comprises first at least one of the following two steps:

1. Reacting about 1 mole of a di-alkylol-halophenol having the formula:

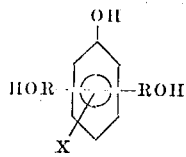

wherein X is a halo group, and at least about two moles of a phenol substituted with at least one bulky hydrocarbon group having from one to 22 carbon atoms, or at least one amino substituted alkyl group of from one to 22 carbon atoms, or at least one halogen group, at a temperature from about 50°C. to about 130°C. in the presence of a water soluble acid.

2. Reacting about one mole of a haloplenol and at least about two moles of a monoalkylolphenol substituted with at least one bulky hydrocarbon group having from one to 22 carbon atoms, or at least one amino substituted alkyl group of from one to 22 carbon atoms, or at least one halogen groups, at a temperature from about 50°C. to about 130°C. in the presence of a water soluble acid.

The product obtained by either of the steps disclosed above is then reacted with either ammonia or an aliphatic amine of from one to 16 carbon atoms or an heterocyclic amine of up to eight carbon atoms in the presence of an amination catalyst. The desired compound is then separated and recovered from the above reaction medium by well known methods for separating reaction products from a reaction medium.

The stages of the process of this invention may be represented by the following reactions:

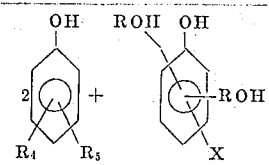

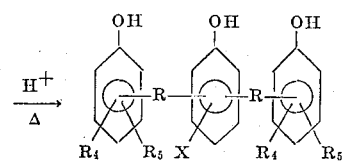

As previously discussed step 1 may be carried out as follows:

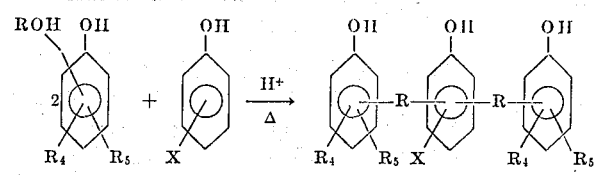

2.

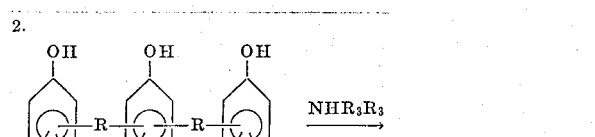

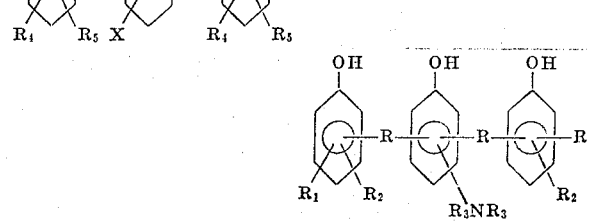

wherein R, $R_1$, $R_2$, $R_3$ and X have the same definitions as set forth hereinabove, and each $R_4$ and $R_5$ individually is hydrogen or a bulky hydrocarbon group having from one to 22 carbon atoms or at least one amino substituted alkyl group of from one to 22 carbon atoms, or a halogen group provided that at least one $R_4$ and/or $R_5$ on each phenolic nucleus is other than hydrogen.

It is quite surprising that the compounds of this invention even exhibit a UV stabilizing effect, since it was generally felt in the art heretofore that phenolic compounds somewhat similar to the type illustrated in this case show oxidation and thermal stabilization properties but no UV stabilization properties.

DESCRIPTION OF PREFERRED EMBODIMENTS

The novel compounds of this invention are represented by the following formula:

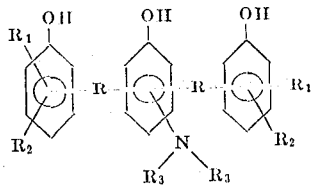

wherein each R individually is a saturated aliphatic hydrocarbon group or linkage (alkylidene or alkylene) of one to eight carbon atoms, preferably of one to three carbon atoms, and most preferably one carbon atom. Examples of some preferred groups are methylene, isopropylene, ethylidene, ethylene, i-propylidene, and n-propylidene, of which methylene is the most preferred.

The hydroxyl group on each phenolic ring can be in any position relative to the R group or linkage, and preferably is ortho to the R group or linkage.

Each $R_1$ and $R_2$ individually is either hydrogen or a bulky hydrocarbon group of from one to 22 carbon atoms, or an amino substituted alkyl group from one to 22 carbon atoms, or $-NR_3R_3$, provided that at least one $R_1$ or $R_2$ on each phenolic nucleus is either a bulky hydrocarbon group of from one to 22 carbon atoms, or an amino substituted alkyl group of from one to 22 carbon atoms, or $-NR_3R_3$.

Usually, the bulky hydrocarbon group is free of non-benezoid unsaturation. Each $R_1$ and $R_2$ is preferably a bulky hydrocarbon group. Examples of some preferred $R_1$ and $R_2$ bulky hydrocarbon groups are methyl, ethyl, t-butyl, t-amyl, t-hexyl, cyclohexyl, t-pentyl, t-octyl, phenyl, naphthyl, α-methylcyclohexyl, nonyl, benzyl, menthyl, isobornyl, phenanthryl, anthranyl, norbornyl, cyclopropyl, cyclopentyl, bicyclohexyl, cyclobutyl, 1,2-dimethylcyclopropyl, and xylyl. More preferably each $R_1$ and $R_2$ individually is a bulky hydrocarbon group of from one to 12 carbon atoms, and even more preferably is an alkyl group containing one to 22 carbon atoms. It is especially preferred that the bulky hydrocarbon is an alkyl group. This applies to the carbon atom range of one to 22 as well as to the more preferred carbon atom range of one to 12. The most preferred $R_1$ group is tert.-butyl. The most preferred $R_2$ group is methyl.

The amino substituted alkyl groups of from one to 22 carbon atoms can be represented by the formula $-R_6NR_7R_7$ wherein $R_6$ is a saturated aliphatic divalent hydrocarbon group of from one to 22 carbon atoms and each $R_7$ individually is either H or an alkyl group of from one to eight carbon atoms or both $R_7$'s are linked together so that $-NR_7R_7$ forms a heterocyclic ring of up to eight carbon atoms and preferably four or five carbon atoms. Usually the total sum of the carbon atoms of $R_6$ and both $R_7$'s is not greater than 22 carbon atoms.

Some preferred amino substituted alkyl groups are:

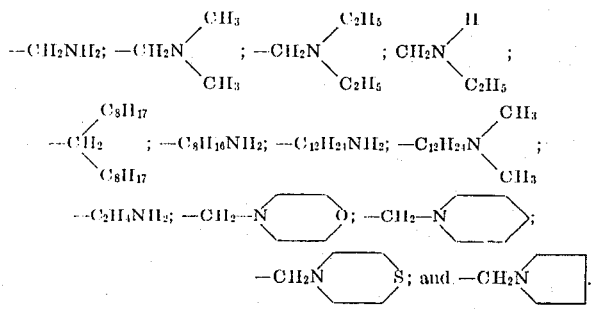

Each $R_3$ individually is either hydrogen or a lower alkyl of one to eight carbon atoms, or both $R_3$'s are bridged together so that $-NR_3R_3$ is a heterocyclic radical of up to eight carbon atoms. Preferably the alkyl group is of one to three carbon atoms and most preferably is two carbon atoms. Each $R_3$ individually is most preferably hydrogen.

Some preferred amino groups are

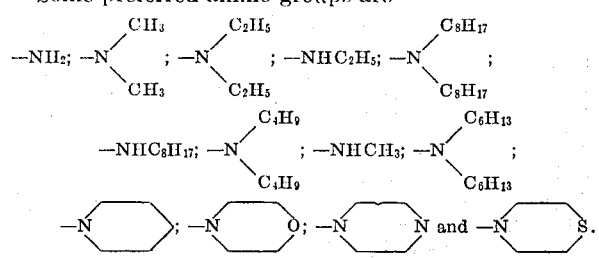

The process aspect of the invention comprises the following steps and materials:

STEP 1 — Briefly this step of the invention comprises reacting about one mole of a di-alkylol-halophenol and about two moles of a phenol.

THE PHENOL

The phenol to be used in this step of the invention is a mononuclear phenol substitutes with at least one bulky hydrocarbon group having from about one to about 22 carbon atoms, or at least one saturated aliphatic amino substituted alkyl group of from one to 22 carbon atoms, or at least one halogen group; and preferably substituted with at least two bulky hydrocarbon groups of from one to about 22 carbon atoms. These groups can be any of the groups defined above for the substituents $R_4$ and $R_5$. Preferably the groups are in the para position and one ortho position in relation to the hydroxyl group on the phenol ring. Suitable phenols contemplated in our invention are 2-tert.-butylphenol, 4-methylphenol, 2-tert.-butyl-4-methylphenol, 2,6-dimethylphenol, 2-nonyl-4-methylphenol, 2-chloro-4-methylphenol; 2-tert.-butyl-4-chlorophenol; 2,4-dichloro-phenol, 2,4-di-tert.-amylphenol, 2,4-di-tert-butylphenol; 2-methyl-4-n-butyl-phenol, α-diethylamino-p-cresol; α-morpholino-p-cresol; α-piperidino-p-cresol and α-pyrrolidino-p-cresol. The most preferred phenol in the process is 2-tert.-butyl-4-methylphenol.

Each $R_1$ and $R_2$ individually can be in any position relative to the OH group on the respective phenolic ring. Preferably each $R_1$ individually is ortho to the OH group on the respective phenolic ring. Preferably each $R_2$ individually is para to the OH group on the respective phenolic ring.

The amino group on the center phenolic nucleus is any position relative to the OH group on that phenolic ring, and preferably is para to the OH group on the center phenolic nucleus. The $R_3$'s of the amino group on the center phenolic nucleus have the same definitions as set forth above.

DI-ALKYLOL-HALOPHENOL

The di-alkylol-halophenol used in this first step of the process is represented by the formula:

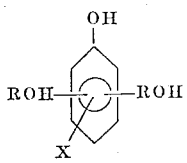

wherein X and R have the same meanings as discussed above. The halo group can be in any position relative to the hydroxyl group of the phenol and preferably is in the position para to the hydroxyl group of the phenol. The preferred halo groups are chloro and bromo, with chloro being the most preferred.

Each alkylol group individually can be in any position relative to the hydroxyl group of the phenol and preferably is in the ortho positions in relation to the hydroxyl group of the phenol.

Each R is an alkyl group of from one to eight carbon atoms, preferably from one to three carbon atoms and most preferably one carbon atom.

Suitable alkylol groups useful in the invention are methylol, ethylol, i-propylol, i-butylol, and 2-ethylhexylol. The preferred alkylol group is methylol.

The di-alkylol-halophenols can be obtained by various well known techniques. For example, these compounds can be obtained by reacting about 1 mole of a halophenol, about one mole of a metal hydroxide, and about 2 moles of an aldehyde of up to about eight carbon atoms in an aqueous medium at a temperature of about 25°C. to 80°C.

The halophenol used in the process just mentioned can have the halo group in any position relative to the hydroxyl group of the phenol, and preferably in the position para to the hydroxyl group of th phenol. Desirable halo substituted phenols are 4-chlorophenol, 4-bromophenol, 4-iodophenol, 2-chlorophenol, 2-bromophenol, 2-iodophenol, 3-bromophenol, 3-chlorophenol and 3-iodophenol. The preferred halo substituted phenols are 4-chlorophenol and 4-iodophenol. 4-chlorophenol is the most preferred mainly because it costs much less than the 4-iodophenol.

The aldehyde to be used in that reaction is any saturated aliphatic aldehyde containing up to about eight carbon atoms. Suitable aldehydes which can be employed in the process are formaldehyde, acetaldehyde, i-butyraldehyde, and caproylaldehyde, of which formaldehyde is the most preferred. For convenience, the formaldehyde is usually supplied in the form of an aqueous solution.

The ratio of halophenol to aldehyde is about one mole per two moles, however, it is understood that either phenol or the aldehyde may be employed in slight excess depending upon the particular components, condition of reaction and the desired results with respect to reaction equilibriums and the like.

Suitable metal hydroxides are the alkali metal and alkaline earth hydroxides.

The metal hydroxide is exemplified by sodium hydroxide, calcium hydroxide, and potassium hydroxide. Sodium hydroxide is preferred. The metal hydroxide may be employed in proportions of about 0.5 moles to 2 moles per mole of phenol.

In addition this reaction is usually conducted in an aqueous medium.

The reaction is conducted at temperatures between about 25°C. and about 100°C. and preferably between about 55°C. and 80°C. of which the most preferred temperature range is between about 60°C. and 80°C. The time required for completing this reaction may vary from about a few hours to several days. It is generally desired to complete the reaction in from about 3 to 8 hours. It is of course recognized that the time is basically dependent upon the amounts of reactants, temperature, and other process conditions.

Usually atmospheric pressure is employed, however, greater or lesser pressures may be employed if desired.

The various reactants can be added in any order. However, preferably the phenol and alkali metal hydroxide are premixed and then added to the aldehyde. This sequence of steps seems to produce the desired compound in much less time at the same temperature than if the reactants are added in a different manner. Also this sequence of steps provides a high yield of product. The desired reaction product is obtained by the conventional steps of acidifying with a strong acid such as hydrochloric acid, obtaining a precipitate, filtering, washing and drying.

REACTION CONDITIONS OF STEP 1

For each mole of the di-alkylol-halophenol, from about two moles to about four moles of the other phenol are employed. It is understood, however, that either reactant may be employed in excess depending upon the particular components, condition of reaction and the desired results with respect to reaction equilibriums, desired degree of purity of the product, and the like.

This step of the reaction is carried out in the presence of a water soluble acid. Suitable acids useful in the invention are hydrochloric acid, sulphuric acid, phosphoric acid, acetic acid, the sulfonic acids such as benzene sulfonic acid, methane sulfonic acid and para toluenesulfonic acid and the like. The temperature employed in this step of the reaction is usually from about 40°C. to about 120°C., and preferably is about from 65°C. to about 110°C. The most preferred temperature range for this step of the reaction is from 95°C. to 105°C. Usually atmospheric pressure is employed in this step of the reaction. However, greater or lesser pressures may be employed if desired. The time necessary to carry out this step is usually between 2 hours and 72 hours, and preferably about 3 hours and 24 hours. The most preferred time is about 12 hours. It is of course recognized that the time is basically dependent upon the amounts of reactants, temperature, and other process conditions. The time is of course inversely related to the temperatures employed.

The desired product from this stage of the reaction can be recovered by such conventional steps as adding a hydrocarbon solvent, such as heptane, and distilling to azeotropically remove the water present. Then filtering, washing and drying the resulting solids.

ALTERNATE STEP 1 — Briefly this alternate step of the invention comprises reacting about 1 mole of a halophenol and about two moles of a mono-alkylolphenol.

HALOPHENOL

The halophenol used in this alternate step can have the halo group in any position relative to the hydroxyl group of the phenol, and preferably in the position para to the hydroxyl group of the phenol. Desirable halo substituted phenols are 4-chlorophenol, 4-bromophenol, 4-iodophenol, 2-chlorophenol, 2-bromophenol, 2-iodophenol, 3-bromophenol, 3-chlorophenol and 3-iodophenol. The preferred halophenols are 4-chlorophenol and 4-iodophenol. 4-chlorophenol is the most preferred halophenol mainly because it costs much less than 4-iodophenol.

MONO-ALKYLOLPHENOL

The mono-alkylolphenol used in the alternate step 1 is represented by the formula:

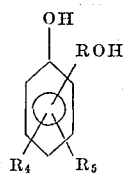

wherein R, $R_4$ and $R_5$ have the same meanings as discussed above.

The $R_4$ and $R_5$ can be in any position relative to the hydroxyl group on the phenolic ring. Preferably these groups are in the para position and one ortho position in relation to the hydroxyl group on the phenolic ring.

Each alkylol group individually can be in any position relative to the hydroxyl group of the phenol and preferably is in the ortho positions in relation to the hydroxyl group of the phenol.

Each R is an alkyl group of from one to eight carbon atoms, preferably from one to three carbon atoms and most preferably one carbon atom.

Suitable alkylol groups useful in the invention are methylol, ethylol, i-propylol, i-butylol, and 2-ethylhexylol. The preferred alkylol group is methylol.

The mono-alkylolphenol can be obtained by various well known techniques. For example, these compounds can be obtained by the same general method discussed hereinabove for preparing the di-alkylol-halophenols. The difference merely being the use of a "phenol" instead of a "halophenol" and the preferred ratio of reactants.

The "phenol" employed in this step is the same as the phenol previously described as one of the reactants in step 1. The preferred ratio of ingredients is about 1 mole of a phenol in about 0.5 moles of a metal hydroxide, and about 1 mole of an aldehyde.

REACTION CONDITIONS OF ALTERNATE STEP 1

The reaction conditions and recovery methods disclosed hereinabove for the reaction of a di-alkylol-halophenol with a phenol (Step 1) likewise apply to the reaction of a halophenol and a mono-alkylolphenol (Alternate Step 1).

STEP 2 — The final stage of the reaction is an amination step involving the replacement of a halo group with an amino group. This step is accomplished by reacting the product as set forth in the above disclosed stage with either ammonia or an aliphatic primary amine of from one to about eight carbon atoms, or an aliphatic secondary amine of from two to about 16 carbon atoms provided no individual carbon chain is greater than eight carbon atoms or a heterocyclic secondary amine of up to 8 carbon atoms. The preferred primary amines are of from one to three carbon atoms, and most preferred two carbon atoms. The preferred secondary amines are of two to six carbon atoms, and the most preferred of four carbon atoms. The preferred heterocyclic secondary amines contain four or five carbon atoms.

Suitable amines to be employed in our reaction are diethyl amine, dimethyl amine, ethyl amine, dioctyl amine, octyl amine, dibutyl amine, methyl amine, dihexyl amine, morpholine, piperidine, pyrrolidine, and piperazine. The most preferred amine is diethylamine. Ammonia is the most preferred ingredient to be used for this stage of the reaction.

The ammonia is most conveniently added to the reaction mass as an aqueous solution. The concentration of the ammonia in such a medium should be between about 5 percent by weight and about 28 percent by weight. The most preferred concentration of ammonia in the aqueous system is about 28 percent by weight. The ammonia or amine is generally used in large molar excess. Preferably the ratio of the ammonia or amine to the reaction product obtained from the stage set forth above is from about 50 to 100 moles of ammonia or amine to about 1 mole of reaction product.

The temperature employed during this stage of the reaction is between about 25°C. and about 200°C. and is preferably about 100°C. and about 150°C. The most preferred temperature range is between about 125°C. and about 130°C. The catalyst employed in this stage of the reaction can be any known amination catalyst such as magnesium, copper salts, copper and tin salts. It has however been found that combinations of copper and a copper salt as the catalyst provide an improved amination step as compared to other amination catalyst with respect to the time necessary to complete the reaction using comparable quantities of catalyst and/or employing comparable temperatures. The preferred catalyst is a 50—50 mixture of $Cu_2Cl_2$ and copper. The amount of catalyst employed is usually between about 0.1 part and 20 per cent by weight based upon the total weight of reactants. Of course, larger or smaller amounts of the catalyst can be employed if desired, but no real advantage is seen in using such amounts. Preferably between about 5 parts and about 15 parts of catalyst per 1,000 weight parts of reactants is employed. The most preferred quantity of catalyst is about 10 parts by weight per 1,000 parts of total reactants. This stage of the reaction is generally carried out under a pressure of about 0 psig to about 250 psig and preferably under a pressure of about 150 to 200 psig.

The time for carrying out this stage is of course dependent upon the amounts of reactants, temperature, pressure, and other reaction conditions. Usually times from about 1 hour to about 12 hours are employed. The most preferred time is about 3 hours. The desired products can be separated from the reaction mass by the conventional steps of filtration, washing, and recrystallization.

The trinuclear phenolic compounds of the invention are useful as ultraviolet stabilizers in a wide variety of materials. Among such materials are synthetic polymers, rubber (natural and synthetic), waxes, fats and oils. Among the synthetic polymers which may be stabilized with the products of this invention are: polyolefins, such as polyethylene, polypropylene and polybutene; diene rubbers, such as polyisoprene, polybutadiene, copolymers of conjugated dienes and at least one other copolymerizable monomer such as styrene, acrylonitrile, methyl acrylate, and 2-vinyl pyridine; polystyrene; polyacrylates; vinyl chloride polymers; polyesters; epoxies; polyacetals; polyurethanes and others. The products of this invention are particularly effective in stabilizing polyolefins, e.g. polypropylene and polyethylene. The amount of UV stabilizers needed to stabilize a particular amount of polymeric material can obviously be varied over a wide range of proportions dependent upon the identity of the specific polymeric material, the desired degree of stabilization, and the environment in which the material is to be used. An amount of about 0.1 percent by weight based upon the material to be stabilized is very effective. The threshold at which the compounds of the invention are effective is about 0.001 percent by weight based upon the weight of material to be stabilized. The compounds of the invention are used in amounts as high as 5 percent by weight or higher based upon the weight material to be stabilized.

The compounds of this invention have exhibited greatly superior UV stabilizing properties as compared to similar trinuclear phenolic compounds which do not contain the specified amine substituent on the center phenolic nucleus. The compounds of this invention have exhibited UV stabilizing properties which are as much as about ten times as great as those exhibited by similar compounds, as will be illustrated in the following non-limiting examples in which all parts are by weight unless the contrary is stated.

EXAMPLE 1

Step A

To 120 parts of a 50 percent aqueous formaldehyde solution (2.0 moles) at 60°C. in a glass vessel equipped with a stirrer, is added dropwise and with agitation over approximately 1 hour, a solution consisting of 128.4 parts 4-chlorophenol (1.0 mole), 40 parts sodium hydroxide (1.0 mole) and 160 parts of water. The temperature is maintained between 60° and 70°C. during the addition, by cooling or heating as required. After completion of this addition the reaction mixture is heated at 75°–80°C. for 3 hours, then cooled to ambient temperature and acidified with concentrated hydrochloric acid to a pH of approximately 3. A precipitate is obtained, which is then filtered, washed acid-and chloride-free with water and vacuum dried, to yield 155 parts of (I) (5 chloro-2-hydroxy-$\alpha,\alpha'$- m-xylenediol) melting at 155°–156°C.

Step B

To 650 parts (4.0 moles) 2-tert.-butyl-4-methylphenol (II) at 65°, with agitation is added 188 parts (1.0 mole) of (I) (5 chloro-2-hydroxy-$\alpha,\alpha'$- m-xylenediol) and 40 parts concentrated hydrochloric acid of 37 percent by weight concentration. The mixture is then heated at 95°–105°C. for 72 hours, at which time it is cooled to about 60°C. About 684 parts of heptane is then added all at once. The mixture is distilled and the water azeotropically removed. The resulting solids are filtered, washed with heptane, and dried to yield about 170 parts of product (III) melting at 187°–197°C.

Step C

Twenty-four parts of product (III) (0.05 mole), 2 parts of $Cu_2Cl_2$, 2 parts of finely divided copper and 250 parts of aqueous ammonia containing 28 percent by weight ammonia are charged to a suitable reactor capable of agitation under pressure. The reactor is purged with nitrogen, sealed, and the reactants heated at 125°–130°C. for 3 hours with agitation at approximately 150–200 psig. The reactor is cooled to ambient temperature. The reaction mixture is then diluted with about 1,000 parts of water. A precipitate results, and it is filtered and recrystallized from acetone to yield approximately 18 parts of the product, 2,6-bis[(2 hydroxy-3-tertiary butyl-5 methyl phenyl)methyl]-4 amino phenol, melting at 128°–130°C. and having the following formula as determined by elemental analysis:

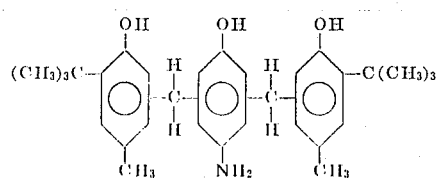

EXAMPLE 2

Twenty-four parts of product (III) (0.05 mole) obtained from Step B of Example 1, 2 parts of $Cu_2Cl_2$, 2 parts of finely divided copper and 250 parts of aqueous diethyl amine containing 40 percent by weight diethylamine, are charged to a suitable reactor capable of agitation under pressure. The reactor is purged with nitrogen, sealed, and the reactants heated at 125° – 130°C. for 3 hours with agitation at approximately 75 to 100 psig. The reactor is cooled to ambient temperature. The reaction mixture is then diluted with about 1,000 parts of water. A precipitate results and it is recrystalized from ethanol to yield approximately seven (7) parts of the product, 2,6-bis[(2-hydroxy-3-t-butyl-5-methylphenyl)methyl]-4-diethyl aminophenol, melting at 144° – 152°C., and having the following formula as determined by elemental analysis:

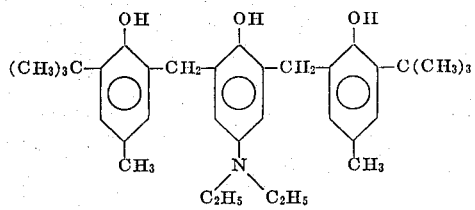

EXAMPLE A

The product of Example 1 is admixed with a polyethylene of 0.96 density and 300,000 molecular weight in a steel container and the mixture is extruded twice at 300°F. The concentration of the product of Example 1 is then adjusted to 0.1 percent by weight of the polymer by the addition of more of the polyethylene and the mixture is again extruded twice at 300°F. The resulting polyethylene compositions are then pressed into a 6–6.5 mil film at 310°F. and 1,280 p.s.i. on a 10 inches hydraulic ram press. Likewise a film of the same polyethylene without any UV stabilizer and a film of the same polyethylene containing 0.1 percent of some other UV stabilizer are prepared by the method set forth above. The resulting films are then subjected to UV light at ambient temperature. The absorbance in the carbonyl region of the IR Spectrum (5.8 microns) is then recorded after periods of exposure. When absorbance reaches 94 percent, the sample is considered to be "oxidized," and the hours of exposure to reach this point is recorded. The "stabilization factor" is arrived at by the formula:

U.V. stabilization factor=Hours to degrade sample/hours to degrade identically treated, *unstabilized* film

| Additive | U.V. stabilization factor |
|---|---|
| (structure with (CH₃)₃C—, CH₃, CH₃, CH₃, C(CH₃)₃) | 0.75 |
| (structure with (CH₃)₃C—, CH₃, NH₂, CH₃, C(CH₃)₃) | 7.45 |
| None | 1.00 |

EXAMPLE B

The product of Example 2 is admixed with a polypropylene of 0.90 density and approximately 325,000 molecular weight in a steel container and the mixture is extruded twice at 380°F. The resulting polypropylene composition containing 0.5 percent by weight of product of Example 2 is then pressed into a 6–6.5 mil film at 350°F. and 1,280 p.s.i. on a 10 inches hydraulic ram press. Likewise a film of the same polypropylene without any UV stabilizer is prepared by the method set forth above. The resulting film is then subjected to UV light at ambient temperature. The absorbance in the carbonyl region of the IR Spectrum (5.8 microns) is then recorded after periods of exposure. When absorbance reaches 94 percent, the sample is considered to be "oxidized," and the hours of exposure to reach this point is recorded. The "stabilization factor" is arrived at by the formula:

U.V. stabilization factor=Hours to degrade sample/hours to degrade identically treated *unstabilized* film

| Additive | U.V. stabilization factor |
|---|---|
| (structure with (CH₃)₃C—, CH₃, N(H₃C₂)(C₂H₅), CH₃, C(CH₃)₃) | 2.10 |
| None | 1.00 |

What is claimed is:

1. Compound having the formula:

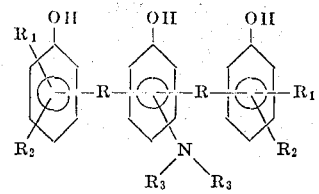

wherein each R individually is an alkylene or alkylidene group of one to three carbon atoms; each $R_1$ and $R_2$ individually is selected from the group consisting of hydrogen, and alkyls totaling up to 10 carbon atoms, — $NR_3R_3$, and an amino substituted alkyl group of the formula — $R_6NR_7R_7$ where $R_6$ is an alkylene group of one to 12 carbon atoms and $R_7$ are independently selected from hydrogen and alkyls of one to eight carbon atoms; and each $R_3$ individually is selected from the group consisting of hydrogen, and alkyls of one to eight carbon atoms; and further provided that at least one $R_1$ and $R_2$ is other than hydrogen.

2. The compound of claim 1 wherein the R groups are either ortho or para to the hydroxyl group on each phenolic ring.

3. The compound of claim 1 wherein the $R_1$ groups are ortho to the hydroxyl group on their respective phenolic rings.

4. The compound of claim 1 wherein the $R_2$ groups are para to the hydroxyl group on their respective phenolic rings.

5. The compound of claim 1 wherein the — $NR_3R_3$ group of the center phenolic nucleus is para to the hydroxyl group on said nucleus.

6. The compound of claim 1 wherein each $R_2$ is methyl.

7. The compound of claim 1 wherein each R is methylene.

8. The compound of claim 1 wherein each $R_3$ is hydrogen.

9. The compound of claim 1 wherein each $R_1$ is an alkyl of one to nine carbon atoms.

10. The compound of claim 1 wherein each $R_1$ is tertiary butyl.

11. The compound of claim 1 wherein each $R_2$ is an alkyl of one to nine carbon atoms.

12. The compound of claim 1 wherein each $R_3$ is ethyl.

13. The compound 2, 6-bis- -4-amino phenol.

* * * * *

UNITED STATES PATENT OFFICE
CERTIFICATE OF CORRECTION

Patent No. 3,728,391  Dated April 17, 1973

Inventor(s) Michael Robin & Sheldon R. Schulte

It is certified that error appears in the above-identified patent and that said Letters Patent are hereby corrected as shown below:

In Column 1, line 32; "produce" should be corrected to --product--.

In Column 5, line 62; "th" should be corrected to --the--.

In Column 7, line 15; "temperatures" should be corrected to --temperature--.

Signed and sealed this 17th day of September 1974.

(SEAL)
Attest:

McCOY M. GIBSON JR.
Attesting Officer

C. MARSHALL DANN
Commissioner of Patents